(12) United States Patent
Gibson et al.

(10) Patent No.: US 8,233,588 B2
(45) Date of Patent: Jul. 31, 2012

(54) METHOD AND APPARATUS FOR INSPECTION OF MATERIALS

(75) Inventors: Gary Gibson, Sedgefield (GB); Max Robinson, Shincliffe (GB)

(73) Assignee: Kromek Limited, Durham (GB)

( * ) Notice: Subject to any disclaimer, the term of this patent is extended or adjusted under 35 U.S.C. 154(b) by 222 days.

(21) Appl. No.: 12/452,840

(22) PCT Filed: Aug. 15, 2008

(86) PCT No.: PCT/GB2008/050710
§ 371 (c)(1),
(2), (4) Date: Apr. 19, 2010

(87) PCT Pub. No.: WO2009/024817
PCT Pub. Date: Feb. 26, 2009

(65) Prior Publication Data
US 2010/0220835 A1    Sep. 2, 2010

(30) Foreign Application Priority Data

Aug. 17, 2007  (GB) .................................. 0716045.0

(51) Int. Cl.
*G01N 23/06* (2006.01)
(52) U.S. Cl. ............................................. 378/53; 378/57
(58) Field of Classification Search ............. 378/57, 378/53
See application file for complete search history.

(56) References Cited

U.S. PATENT DOCUMENTS

| | | |
|---|---|---|
| 4,247,774 A | 1/1981 | Brooks |
| 5,060,249 A | 10/1991 | Eisen et al. |
| 5,073,915 A | 12/1991 | Zhang |
| 5,319,547 A | 6/1994 | Krug et al. |
| 5,694,447 A | 12/1997 | Ito |
| 5,768,334 A | 6/1998 | Maitrejean et al. |
| 5,943,387 A | 8/1999 | Lynch et al. |
| 6,018,562 A * | 1/2000 | Willson ............................ 378/9 |
| 7,197,172 B1 | 3/2007 | Naidu et al. |

FOREIGN PATENT DOCUMENTS

| | | |
|---|---|---|
| EP | 358965 A1 | 3/1990 |
| EP | 1 271 405 A2 | 1/2003 |
| GB | 2 400 436 | 10/2004 |
| JP | 61128145 | 11/1984 |
| JP | 6121791 | 10/1992 |
| JP | 8178873 A | 7/1996 |
| WO | WO 03/042675 | 5/2003 |
| WO | WO 2005/009206 | 2/2005 |

OTHER PUBLICATIONS

Naydenov S V et al: "Multi-energy approach in radiography and introscopy" Nuclear Instruments & Methods in Physics Research, Section—A:Accelerators, Spectrometers, Detectors and Associated Equipment, Elsevier, Amsterdam, NL, vol. 537, No. 1-2, Jan. 21, 2005, pp. 462-466, XP004708897 ISSN: 0168-9002.

(Continued)

*Primary Examiner* — Courtney Thomas
(74) *Attorney, Agent, or Firm* — Drinker Biddle & Reath LLP

(57) ABSTRACT

A method of and apparatus for obtaining radiation interaction data related to an image of an object. The method involves using a detector system for detecting and collecting spectroscopically resolvable information about incident radiation, and collecting one or more datasets of information at the detector after interaction with an object. Each dataset is resolved across at least three frequency bands within the spectrum of the source. The ratio between measured intensities is evaluated for at least two pairs of such frequency bands in a given intensity dataset to obtain a numerical indicator in functional relationship with a material property. The numerical indicator is then compared with a library of data characteristics of target materials. An apparatus is also disclosed for inspection of materials.

26 Claims, 5 Drawing Sheets

OTHER PUBLICATIONS

Fryar J et al: "Multielement Imaging in Computerised X-Ray Tomography", Nuclear Instruments & Methods in Physics Research, Section—A:Accelerators, Spectrometers, Detectors and Associated Equipment, Elsevier, Amsterdam, NL, vol. A271, No. 3, Sep. 1, 1988, pp. 671-677, XP000021215 ISSN: 0168-9002.

Search Report, UK Application GB0716045, Nov. 14, 2007, 2 pages.

PCT Written Opinion, PCT/GB2008/050710, Feb. 24, 2010, 5 pages.
PCT International Preliminary Report on Patentability, PCT/GB2008/050710, Feb. 24, 2010.

* cited by examiner

METHOD AND APPARATUS FOR INSPECTION OF MATERIALS

FIELD OF THE INVENTION

The invention relates to a method and apparatus for the inspection and characterisation of materials. The invention in particular relates to an apparatus and method making use of high energy radiation such as x-rays or gamma-rays to scan objects where it is desirable to gain information about their internal contents and/or composition. The invention may further relate to a method and apparatus that operates by or in conjunction with the generation of an image of the material, but is not limited to such imaging.

BACKGROUND

The principle of scanning objects with high energy radiation such as x-rays or gamma-rays is widely employed for example in the security industry. The invention is discussed below by way of example in such a context but might also be employed in other areas, for example, without limitation, medical imaging, imaging for quality control purposes or the purposes of determining the integrity of the structure, or the like.

Security scanning is particularly directed at the identification of undesirable materials or objects, and especially explosives or weapons, in airline baggage. Airport security must in particular ensure that no explosive material is allowed on board any aircraft. Various strategies are employed in order to achieve this goal, however one of the most important is the screening of hold baggage using x-ray machines that have automated explosive detection capability.

Many techniques and technologies have been proposed for creating machines that can automatically detect contraband materials. Example include x-ray diffraction, x-ray scattering, Mossbauer spectroscopy and NQR. However the only technology currently accepted by the TSA (Transportation Security Agency: US government) is one that utilises a computerised tomography (CT) approach to identifying materials.

Whilst these known apparatus and methods perform the desired role, there are a number of areas that need to be improved especially in relation to false detection rates, for example between 15 and 30% of submitted articles. Any articles that are deemed to be suspicious have to go on for further screening and so a high false alarm rates greatly limits the productivity of these machines.

Prior art machines take scans of the baggage at different angles and by looking at the x-ray transmission image they analyse intensity of the beam produced by the materials within the baggage. To maintain adequate throughput the scanning processing is typically much reduced when compared to medical applications where a volume rendered image is desired. The method relies on the building up of an empirical database of suspect material and a comparison of the intensity of information produced by the materials in the baggage obtained by numerical analysis of the slices obtained by the reduced CT scan with the database thus making it possible to identify potentially dangerous material. However, there are limitations to the extent to which such data can characterise material as such.

The transmission of x-rays through a material can be given by the exponential attenuation law, as follows:

$$I/Io = \exp[-(\mu/\rho)\rho t] \quad (1)$$

Where $\mu/\rho$=Mass attenuation coefficient, a material constant which is characteristic of the weighted elemental composition of a material
I=Final intensity
Io=Initial intensity
$\rho$=density of the material
t=thickness of the material The approach taken in the CT methodology is to vary the path taken by the x-rays through the baggage. This effectively changes the thickness of the material, the term 't' in the equation. Thus by looking at the variation in the x-ray transmission deductions can be made about the mass attenuation coefficient and the density of the material. These two parameters are characteristic of different materials and so materials identification becomes possible.

One of the problems is that more than one material will frequently be in the system path and so the results of combinations of materials needs to be determined. This requires an extensive database of information and sophisticated algorithms.

In addition, as the beam direction changes, the relative amount of each material in the x-ray path will also change. This adds yet more uncertainty.

Finally the density term and mass coefficient term are convoluted adding further difficulties.

It can be seen that there are many reasons for the high false alarm rates given by CT and like methods.

U.S. Pat. No. 5,367,552 is an early example of a system using CT type scanning to detect explosives. This reference illustrates the reduction in typical scans used by the technology in an explosives detection field.

A number of sources have suggested use of the above relationship numerically to derive mass attenuation terms as an aid to materials identification.

U.S. Pat. No. 5,319,547 describes using two monochromatic x-ray sources and looking at relative ratios in order to identify materials from the differences in their transmission values.

U.S. Pat. No. 5,768,334 uses a single x-ray source but altered the output energy by spinning a filter wheel of different materials through the beam. It then described use of comparative techniques to determine whether the sample under inspection contained any of the component materials in the filter wheel. The technique is limited by the number of materials that can be placed in the filter wheel and it is also slow as a signal needs to be obtained across each part of the filter wheel.

U.S. Pat. No. 6,018,562 uses multiple x-ray tubes running at different powers with suitable multiple detectors. The broadness in the energy of the beams in each tube means that the precision in the determination of the mass attenuation coefficient is limited which also compromises the ability to distinguish similar materials.

WO2005/009206 tackled the problem of gaining x-ray photons of different energies by varying the power going into an x-ray source. This has the advantage of being able to produce x-rays at many different power levels and hence at different energy spectrums. However the problem of the width of the energy band remains. It is also a slow approach as spectrum across the power source range defined needed to be collected at each point of the sample.

All of these methods have in common the selection of energy upstream of the detector, for example at the source, by provision of multiple sources and/or additional filters, multiple detectors tuned for different energies etc.

X-Ray absorption has also been used for some time as the basis for screening objects to create some form of representational image of the contents or components thereof relative to each other in three-dimensional space. The thicker or more dense an object is then the more it will attenuate an x-ray beam. By use of suitable detectors and a suitable source, radiographs of an item under screening in the form of images based on the absorption of an object or set of objects can be generated. In airline security applications, the principle is encountered in particular in relation to hand baggage scanners. X-ray imaging might also be used in principle as a supplementary system for hold baggage (the reduced CT scan of the detection application being limited as regards imaging capability) but this is less common.

This apparatus may be limited in that it tends to give limited information about the material content. At its simplest, all that is being measured is transmissivity. The detector merely collects amplitude information. In most practical systems even this is measured indirectly. A typical linear array x-ray detector comprises in combination a scintillator material responsive to transmitted x-rays, which is then caused to emit lower frequency radiation, and for example light in or around the visible region, in combination with a semiconductor detector such as a silicon or gallium arsenide based detector which is responsive to this lower frequency radiation.

However, it is known that the absorption properties of any material can vary with energy, and that the amount by which the absorption properties vary depends in particular on atomic number (in part at least because different absorption effects predominate). This has led to development of dual-band or dual-energy detectors which are capable of separately differentiating, at least to some degree, between low- and high-energy bands. Such a dual-energy sensor typically comprises a sandwich pair of semiconductor photodiode rays or the like, in conjunction with a low-energy and a high-energy scintillator, such that the respective detectors detect transmission of low-energy and high-energy x-rays. The differential absorption effect is exploited by the dual energy detector to differentiate generally between objects having lower and higher atomic number elements predominating.

When exploited as part of a security or material imaging system, a very crude approximation can be made that organic materials tend to be in the former category and most inorganic materials in the latter category. The practical implications of this have led to its use in the security industry, and for example in airport x-ray scanners, either to create separate images of metallic items inside luggage (to reveal items hidden metal weapons, such as guns, and knives) or to identify plastic explosives.

Such a system is of limited effectiveness. For example, considering use of the principle in explosives scanners, it is true that most explosives are dense organic materials usually high in nitrogen content. There is therefore some limited merit in the use of dual energy detectors but it is far from being a precise explosive detector since many other items in luggage, such as soaps, creams, leather goods etc are also such dense organic materials.

A dual energy system thus confers only limited information about composition. The organic/inorganic division is crude and approximate. Conventional detectors do not give any real information about material composition. At best, crude presumptions are made based on the presence or otherwise of x-rays within two distinct bands of the spectrum, usually in conjunction with a radiograph which is based on the shape of items and their proximity to other objects.

U.S. Pat. No. 4,247,774 represents a general reference to the use of a dual-energy detector system in relation to computer assisted topography in a medical, imaging application.

SUMMARY OF THE INVENTION

It is an object of the present invention to mitigate some or all of the above disadvantages of prior art scanning systems and methods.

It is a particular preferred object of the present invention to provide a method and apparatus for scanning of objects, and especially of containers of multiple objects or objects comprising multiple components, which provides information about their composition.

It is a particular preferred object of the present invention to provide a method and apparatus for scanning of objects which derives direct and numerical information correlating to object composition from the dataset itself.

Therefore, according to one aspect of the invention there is provided a method of obtaining radiation data from, and preferably an image of, an object comprising the steps of:
providing a radiation source such as an x-ray or gamma-ray source and a radiation detector system such as an x-ray or gamma-ray detection system spaced therefrom to define a scanning zone therebetween, the detector system being capable of detecting and collecting spectroscopically resolvable information about incident radiation;
collecting one or more datasets of intensity information about radiation incident at the detector system and hence interaction of an object in the scanning zone with incident radiation at least one and preferably a plurality of scanning positions, and preferably generating an image of an object in the scanning zone, from radiation received at the detector system after interaction with and for example after transmission through the object;
resolving each said intensity dataset across at least three frequency bands within the spectrum of the source to produce an intensity data item for each band;
evaluating a numerical relationship and for example the ratio between intensity data items for at least two pairs of such frequency bands in a given intensity dataset and for example each successive such frequency band to obtain at least one numerical indicator in functional relationship with a characteristic physical material property such as a material coefficient associated with material interaction with the source radiation that varies functionally with radiation energy and for example a mass attenuation coefficient associated with radiation interaction and thus with the intensity dataset;
comparing the same with a library of data indicative of such characteristic physical material property for a range of potential component liquids, and in particular for example with such physical material property characteristic of target materials such as suspect materials, in order to obtain an indication of the likely material content of material in the scanning zone and for example in a transmission path producing such intensity dataset.

The radiation source comprises a source to deliver high-energy radiation such as ionizing radiation, for example high energy electromagnetic radiation such as x-rays and/or gamma rays, or subatomic particle radiation, and the detection system is adapted correspondingly to detect radiation in this spectrum. In accordance with the invention, intensity data from an interaction between radiation such as x-rays, gamma rays or the like and an object in the scanning zone, involving for example transmission, scattering, backscattering, absorption etc, is thus collected in a generally conventional manner. For each "scanning event" (that is, for a measurement of intensity via a given radiation path incident upon and for example passing through a given object in a given position) an "intensity dataset" is collected representing the collected intensity incident at the detector across at least part of a source energy spectrum. However, the key to the invention is that a detection system is used which is capable of detecting intensity data for a given "scanning event" in at least three separate energy bands across the spectrum of the source. An intensity dataset thus constitutes a dataset of intensity information related to frequency/energy which is resolvable into at least three such bands to produce at least three intensity data measurements or data items relating to a given scanning event and hence a given transmission path through the object/material under test.

It is fundamental to the invention that a detection system is used which is capable of detecting intensity data for a given "scanning event" in at least three separate energy bands across the spectrum of the source at the detector. Energy is selected at the detector. Spectral resolution is effected at the detector.

Prior art systems typically use combinations of multiple sources and/or multiple detectors with filters and the like to select from the broad band spectrum of a source a narrow frequency band, and for example lower and higher frequency bands, from which data can be collected and analysed. Energy is selected at the source(s) or otherwise upstream of the detector. This does not exploit the full potential of information that could be obtained from transmission levels across a greater part of the full spectrum of a broad band source.

By contrast in the present invention energy selection takes place inherently at the detector. Any suitable source or combination of sources with resolvable breadth can be used. It is possible to selectively look at narrow portions of an x-ray spectrum. This allows the necessary intensity data variation with energy to be measured in a very precise fashion which gives excellent materials identification ability. In addition, because portions of the continuous spectrum are selected then a standard broad x-ray source can be used rather than specialized sources. Also as any part of the spectrum can be selected there is no need for multiple sources operating at different power/energy settings. A single source may be sufficient. Another advantage is that the data for each section of the spectrum can be collected simultaneously rather than sequentially leading to much faster throughputs.

In one possible embodiment, a single broad spectrum source may be used. In this embodiment the method of the invention involves using a broad spectrum detector or detector array with a single broad spectrum source to resolve information across the spectrum of source using the inherent properties of the detector rather than using multiple sources and/or multiple detector arrays with narrow band frequency filters it offers the potential for much more sophisticated numerical analysis, and much more complete collection of and use of information across the source spectrum, than is provided by prior art systems relying for example on multiple sources with different frequency filters.

In accordance with the invention, for each scanning event, a numerical relationship is determined for at least two pairs of such resolved intensity data item measurements. This may be any numerical relationship derived for example by application to a pair of data items of any numerical operator suitable for fitting observed data to a theoretical relationship as below. In the example embodiment a ratio between pairs of intensity data items is determined. Thus a dataset of multiple numerical relationships is generated.

The dataset of numerical relationships is analysed to obtain at least one numerical indicator in functional relationship with a physical material property such as a material coefficient. This material property/coefficient is selected to be associatable with the produced intensity dataset in the sense that it is a material property/coefficient known to determine intensity of the collected radiation in functional manner that varies with energy. Typically, a numerical indicator is obtained by fitting the dataset of numerical relationships derived from the observed results numerically, and for example iteratively, to any suitable known relationship that ties intensity data for a radiation interaction to the suitable material property or coefficient. In particular a material property or coefficient that varies with intensity in a characteristic functional relationship is suitable and is determined as such numerical indicator by fitting collected data to a suitable equation from which it can be derived. Thus, a numerical indicator is derived which has a functional relationship with a suitable material property or coefficient, and conveniently is a suitable material coefficient or constant. By the use of a dataset of multiple numerical relationships for multiple data items, and by selection of a suitable numerical indicator, it can be possible to eliminate most or all of the other variables from such an equation and derive the required numerical indicator/coefficient in such manner as to be capable of characterising a target material component of a sample under test. This can be referenced to a suitable library of equivalents to the numerical indicator to aid in identification of the presence of a liquid material associated with the characteristic numerical indicator derived from experimental data as above.

In the example embodiment ratios of at least two pairs of such resolved intensity data item measurements, and for example successive intensity data item measurements, are obtained numerically, to provide representative information which can be correlated to the mass attenuation coefficient necessary to produce such an intensity pattern via the Beer-Lambert law set out in equation (1) above and the following discussion uses this by way of example. However any similar relationship fitting intensity variation with energy resolved at the detector to a material property or coefficient could be envisaged for use in accordance with the method.

As is described in greater detail below, most of the variables associated with a given scanning event are constant with respect to the frequency/energy of the incident radiation from the source. However, the mass attenuation coefficient varies with energy in a characteristic way. By performing such a ratio analysis on intensity data across at least three different energy bands for a given scanning event to generate at least two ratios, data which is representative of the functional relationship between mass attenuation coefficient and incident radiation energy can be obtained. Thus, inferences relating to the specific mass attenuation coefficient applicable to the transmission path through material under test for a given scanning event can be drawn. A comparison is then made to a suitable database of data representative of the mass attenuation coefficient for different materials and/or target objects to give a more representative indication of what is being scanned.

It will be understood that although reference is made herein for convenience to the scanning of an object this should not be considered to limit the application of the invention to the scanning of single homogenous objects. Indeed, for many envisaged applications, an "object" is likely to consist of multiple heterogeneous materials and/or to be a container or other agglomeration of multiple articles, so that any transmitted radiation path is likely to pass through multiple different materials having varied properties. One of the particular advantages of the invention is that it can facilitate resolution of such varied materials.

The key to the methodology of the invention is the ability, by provision of suitable detectors, to resolve the collected radiation with respect to energy/frequency across at least three bands so that relative values from at least two pairs of intensity data items can be calculated. This is considered to be the minimum necessary to allow the numerical analysis required to reduce any influence of other uncertainties affecting transmitted intensity, in particular material density and thickness, both of which are essentially invariant relative to incident energy for a given scanning event.

Nevertheless, whilst three might represent a fundamental minimum, for the scanning of heterogeneous objects and/or "objects" comprising containers or agglomerations of multiple articles a larger plurality of energy-resolved intensity data items is likely to be preferred for the numerical analysis as above described, for example at least five.

Thus the detector system is adapted to generate spectroscopic information about the transmitted radiation at least to the extent of resolving at least three and preferably at least five energy bands. Preferably, the detector exhibits a spectroscopically variable response across at least a substantial part of the spectrum of the radiation source allowing detailed spectroscopic information to be retrieved.

The detector system is capable of being used to detect at least three and preferably at least five specific energy bands. So long as they are resolved, the bandwidth is not directly pertinent to the invention and useful results can be obtained by any suitable approach to dividing the spectrum, either in whole or in part, into separate bands. For example, the entire spectrum or a substantial part thereof may simply be divided between such a plurality of bandwidths, and each data item be considered as a measure representative of intensity across the entire band, and for example an average intensity. Alternatively, a plurality of relatively wide bands, but with discrete gaps therebetween, may be envisaged and analysed on the same basis. Alternatively, "bands" may be narrow even to the point where they essentially approximate to an evaluation of intensity at a single energy. As used herein the concept of intensity at an energy "band" includes evaluation of intensity at such a discrete single energy as well as evaluation of intensity at an energy across a narrow or broad bandwidth.

Similarly the source may be a single broad spectrum source across which a plurality of bandwidths or single energies may be identified. Alternatively or additionally sources may be provided having narrow bandwidths or generating incident radiation at one or more discrete energies to provide some of the energies for comparison in accordance with the method of the invention. In this case the radiation source is a plural source comprising a combination of sources at different energies to provide the necessary total spectrum spread to allow resolution by the detector across a plurality of energies/energy bands.

For example a plural source comprises an x-ray source having a relatively lower energy spectrum, for example operating below 60 keV and for example at 10 to 50 keV and one or more radioisotope sources generating radiation at higher energies, for example above 100 keV.

The source is preferably capable of generating a sufficiently broad spectrum of radiation to enable the spectral resolution necessary for the performance of the invention. Preferably the source generates radiation across at least one or more parts of the range of 20 keV to 1 MeV, and more preferably across at least a part, and for example a major part, of the range of 20 keV to 160 keV. For example the source generates radiation ranging across at least one bandwidth of at least 20 keV within the given range. For example the spectrum is such that at least three 10 keV bands can be resolved within that range.

The transmission of x-rays through a material can be given by the exponential attenuation law set out hereinabove as equation (1), where the approach taken by prior art CT scanners is considered. It can be seen that there are many reasons for the high false alarm rates given by CT and like methods.

By contrast in accordance with the invention it is proposed that transmission or other interaction data may be collected through an object at many (three or more and preferably at least five) different energy bands. If we consider the exponential attenuation equation again in relation to transmitted intensity, it can be seen that the mass attenuation coefficient is one of the terms listed. The mass attenuation coefficient itself is however dependent on the energy of the detected x-rays. The other terms in the equation have no dependence on the x-ray energy. Thus if one measures transmission at multiple energies it is possible to relate the variation in transmission to the mass attenuation coefficient.

As this term is characteristic of the materials present it is therefore possible to identify or characterise particular materials, especially target materials such as explosive materials, in a methodology similar to that used in the CT methodology but without any of the drawbacks or the uncertainties encountered when changing the ray path. This means that technology based on multiple energy scans offers the potential for higher rate of success than is enjoyed by the current technology.

One of the simplest ways to eliminate the additional terms is to take a ratio of the transmission at different energies and for example a ratio of successive readings at a plurality of successive different energies. It can be seen that a ratio will in principle eliminate the material thickness and density as constant terms. This will therefore make the mass attenuation coefficient the only remaining term that will affect the transmission ratio.

The method of the invention is not limited in its application to the mobile scanning and/or imaging of objects. Information pertinent to the mass attenuation coefficient inherent in the dataset for a given scanning event, and hence the material composition of an object or objects in a transmission path, can be obtained by a single scanning event, for example of a stationary object being scanned by a single beam of appropriate geometry, for example a pencil beam or conical beam. In such circumstance the method merely includes placing the object in a scanning zone to obtain such a single scan.

However, in a preferred embodiment information is collected regarding the transmissivity of an object under test in the scanning zone in a plurality of scanning positions between which the object is translated and/or rotated. In accordance with this embodiment of the method, the method comprises the additional step of causing an object to move relative to and for example through the scanning zone as a plurality of such datasets of intensity data are collected.

At its most basic, the invention allows identification of materials from collected and resolved transmission data based on a numerical analysis that provides, with reference to a suitable data library of equivalent or otherwise comparable data for a range of materials and/or objects likely to be encountered in a given application an indication of material content. The data library may comprise information in any suitable form which can be related in a numerically analytical manner to data collected across the resolved energy bands in accordance with the invention. The data library may include standard preset reference materials and/or user input reference materials and/or reference data may be generated from known materials in accordance with the foregoing method. That is, a library of data may be built up by the system, which can in effect "learn" material characterisitics, over time. The data library may comprise electronically stored data and/or data stored on a hard medium, such as a printed resource, and may be held and accessed locally and/or remotely, manually and/or automatically, none of which is directly pertinent to the operation of the method of the invention.

Thus, at its simplest, the invention in the first aspect may simply comprise a method for extracting from energy-related collected intensity data an indication of a suitable and for example similarly energy-related material coefficient, and therefore an indication of liquid composition in the transmission path. It need not generate an image. No particular beam geometry is mandated. A simple, effectively one-dimensional beam geometry producing radiation after interaction in the scanning zone incident upon a simple, single detector may be sufficient.

However, for practical purposes it will often be advantageous that the invention will form part of a scanning imaging system. In accordance with this preferred embodiment, the dataset of information about radiation incidence collected at the detector or at a further detector is used to generate an image of an object in the scanning zone. It is a particular advantage that the present method can generate significant imaging information at high throughput rates, which is not necessarily the case with the reduced CT scan systems used in prior art baggage scanners.

Preferably the method comprises collecting data regarding the intensity of transmitted radiation after interaction with an object or sample in the scanning zone and the data regarding the intensity of transmitted radiation is resolved at the detector both numerically as above described and to produce one or more images. However, other interactions between an object or sample in the scanning zone and incident radiation could be utilized.

In a particular preferred embodiment, as above described, information is collected regarding the intensity of transmitted radiation after interaction with an object including or suspected to include a liquid sample as the object is caused to move relative to and through the scanning zone to collect a plurality of datasets, which are conveniently used to generate a succession of images as an object moves through the scanning zone.

For clarification it should be understood that where used herein a reference to the generation of image is a reference to the creation of information dataset, for example in the form of a suitable stored and manipulatable data file, from which a visual representation of the underlying structure of the object under investigation could be produced, and references to displaying this image are references to presenting an image generated from such a dataset in a visually accessible form, for example on a suitable display means.

The method of the invention conveniently further provides the additional step of displaying such generated image or images, and in the case of multiple images might involve displaying such images simultaneously or sequentially.

An essential requirement for implementation of the invention is that the detector system can generate spectroscopic information about the transmitted radiation. That is, the detector exhibits a spectroscopically variable response across at least a substantial part of the radiation spectrum of the source allowing spectroscopic information to be retrieved. This is resolved across at least three energy bands and a numerical analysis above described is performed to obtain information representative of the material content in a transmission path. Thus, in accordance with the invention a genuine and much more specific identification of a target material or narrow class of materials is possible.

In the preferred embodiment, where an image is also generated, proper resolution of spectroscopic information confers a further advantage. It offers the potential by imaging across a series of bands to create several images which to some extent can reflect the different responses of materials and thus, by distinguishing between each image across each imaging band, for example by representing them differently (such as in different colours) in a resultant combined image, it assists in resolution of different objects, components or parts of the image.

Thus in accordance with a preferred embodiment of the invention, each collected image is resolved spectroscopically across a plurality of conveniently relatively broad "imaging" bands each intended to generate an image across a part of the overall spectrum, so that the imaging bands together allow the generation of an energy-differentiated composite image or succession of images in familiar manner. The number of imaging frequency bands is conveniently between 2 and 10, and for example between 4 and 8.

Spectroscopic detectors can then be operated in an energy selective manner, giving rise to the ability to present an image resolved into a significantly increased number of "imaging" energy bands compared with the two that are available from standard prior art dual energy detectors. This information can be used to improve resolvability of objects of different composition.

This is achieved in accordance with this preferred embodiment in that spectroscopic resolution of transmitted radiation in each such relatively broad band is represented in the generated image. For example, spectroscopic differentiation in the collected data is represented in the image as differentiated colour, shading or marking. A banded mapping is used in that the source spectrum is divided into a plurality of bands, for example between four and eight bands, and different colours are used to represent each such band in the displayed image. The apparatus conveniently includes suitable image processing means to effect this mapping.

An image or composite image or succession of images so generated is preferably displayed on a suitable display means such as a visual display screen.

By analogy, in accordance with a further aspect of the invention there is provided an apparatus for scanning of and obtaining data regarding the interaction of a sample under test, and for example radiation transmission data from, and preferably an image of, an object comprising:

a radiation source and a radiation detector system spaced therefrom to define a scanning zone therebetween and to collect in use a dataset of information about radiation incident at the detector system after interaction with an object in the scanning zone, at least one and preferably a plurality of scanning positions;

a data processing apparatus to process and resolve each such dataset or image spectroscopically across at least three frequency bands within the spectrum of the source and produce an intensity data item for each band;

an intensity data item register to store such resolved data items for each dataset;

a calculation means to evaluate a numerical relationship and for example the ratio between intensity data items for at least two pairs of such frequency bands in a given intensity dataset and for example each successive such frequency band to obtain at least one numerical indicator in functional relationship with a physical material property such as a material coefficient that varies functionally with radiation energy and for example a mass attenuation coefficient associated with radiation interaction and thus with the intensity dataset;

a further data register to store such numerical indicator;

a data library of data indicative of similar characteristic material coefficients such as mass attenuation coefficients in particular for example characteristic of target materials such as suspect materials;

a comparator to compare the numerical indicator with data in the library and derive therefrom an indication of the likely material content of material in a transmission path producing the said intensity dataset.

In use, an object under suspicion is scanned in the scanning zone and interacts with the radiation source. The source comprises a source to deliver high-energy radiation such as ionizing radiation, for example high energy electromagnetic radiation such as x-rays and/or gamma rays, or subatomic particle radiation, and the detection system is adapted correspondingly to detect radiation in this spectrum. In accordance with the invention, intensity data from an interaction between radiation and an object in the scanning zone, involving for example transmission, scattering, backscattering, absorption etc, is collected by a detector. Transmitted radiation intensity is especially useful for many applications. However, as described hereinabove with reference to the method, the detector is itself energy selective and selection of data across a plurality of energy bands is effected at the detector, and not by use of energy selective sources or filters.

The radiation source must produce a distribution of energies across a suitable spectral range for characteristic scattering, and is typically an x-ray source. Tungsten is the most appropriate target, but others could be used.

The source may be a single broad spectrum source across which a plurality of bandwidths (which term, as described above, encompasses herein single energies) may be identified. Alternatively or additionally sources may be provided having narrow bandwidths or generating incident radiation at one or more discrete energies to provide some of the energies for comparison in accordance with the method of the invention. In this case the radiation source is a plural source comprising a combination of sources at different energies to provide the necessary total spectrum spread to allow resolution by the detector across a plurality of energies/energy bands.

For example a plural source comprises an x-ray source having a relatively lower energy spectrum, for example operating below 60 keV and for example at 10 to 50 keV and one or more radioisotope sources generating radiation at higher energies, for example above 100 keV.

The apparatus of the invention has a calculation means that evaluates a numerical relationship and for example the ratio between intensity data items for at least two pairs of such frequency bands by applying a suitable comparative function to obtain a numerical indicator as above described. The apparatus further has a comparator to compare the numerical indicator with data in a library. Any suitable form of calculation means and/or comparator and/or library combining suitable hardware and software and combining automatic and user-input calculation steps can be envisaged. For example a calculation means and/or comparator and/or library comprises a suitably programmed data processing apparatus such as a suitably programmed general purpose or special purpose computer.

It will be understood generally that a numerical step in the method of the invention can be implemented by a suitable set of machine readable instructions or code. These machine readable instructions may be loaded onto a general purpose computer, special purpose computer, or other programmable data processing apparatus to produce a means for implementing the numerical step specified, and in particular thereby to produce a calculation means as herein described.

These machine readable instructions may also be stored in a computer readable medium that can direct a computer or other programmable data processing apparatus to function in a particular manner, such that the instructions stored in a computer readable medium produce an article of manufacture including instruction means to implement some or all of the numerical steps in the method of the invention. Computer program instructions may also be loaded onto a computer or other programmable apparatus to produce a machine capable of implementing a computer executed process such that the instructions are executed on the computer or other programmable apparatus providing steps for implementing some or all of the numerical steps in the method of the invention. It will be understood that a step can be implemented by, and a means of the apparatus for performing such a step composed in, any suitable combinations of special purpose hardware and/or computer instructions.

Optionally, the apparatus is adapted to collect in use radiation intensity data after interaction with an object in a single scanning position and for example includes a means to retain an object in a scanning position such as a receptacle into which an object can be placed. Additionally or alternatively it may include a conveyor to convey an object into and out of such scanning position.

Optionally, the apparatus is adapted to collect in use radiation intensity data after interaction with an object in a plurality of scanning positions as the object moves through the scanning zone, and preferably to collect in use data for an image of an object in the scanning zone, and preferably a succession of images as the object moves through the scanning zone, in that it further comprises an object handler to cause an object to move relative to and through the scanning zone in use.

A detector system in accordance with the invention may comprise a single detector or a plurality of discrete detector elements making up a multi-element system. Where an imaging system is not required, the present invention does not require spatial resolution, but in practice can operate a zero-dimensional intensity only analysis. For simplicity, a single detector may therefore be preferred.

A collimator is preferably provided to produce an emitted beam of suitable geometry from the radiation source. Conveniently, for example where an imaging capability is not required a simple, effectively one dimensional beam may be provided in conjunction with a simple single transmission detector.

For other applications, optionally, the apparatus further includes an image generation apparatus to generate at least a first image from the output of the detector system; and optionally further an image display adapted to display at least the first image.

The display means is conveniently a simple two dimensional display screen, for example a conventional video display screen (which term is intended to encompass any direct display or projection system exploiting any cathode ray tube, plasma display, liquid crystal display, liquid crystal on silicon display, light emitting diode display or like technology). It is a particular advantage that the method can be envisaged for use with, and the apparatus for the invention incorporated into, the standard display screens of comparable existing systems for example in the security or medical imaging fields.

The radiation source must produce a distribution of energies across a suitable spectral range for characteristic scattering, and is typically an x-ray source. Tungsten is the most appropriate target, but others could be used.

It is necessary that the detector system is enabled to detect radiation in a manner which is spectroscopically resolvable by the data processing apparatus. Preferably, a detector system, or some or all discrete detector elements making up a multi-element system, may be adapted to produce spectroscopic resolution in that it exhibits a direct spectroscopic response. In particular a system or element is fabricated from a material selected to exhibit inherently as a direct material property a direct variable electrical and for example photoelectric response to different parts of the source spectrum. For example, the detector system or element comprises a semiconductor material or materials preferably formed as a bulk crystal, and for example as a bulk single crystal (where bulk crystal in this context indicates a thickness of at least 500 μm, and preferably of at least 1 mm). The materials making up the semiconductor are preferably selected from cadmium telluride, cadmium zinc telluride (CZT), cadmium manganese telluride (CMT), germanium, lanthanum bromide, thorium bromide. Group II-VI semiconductors, and especially those listed, are particularly preferred in this regard. The materials making up the semiconductor are preferably selected from cadmium telluride, cadmium zinc telluride (CZT), cadmium manganese telluride (CMT) and alloys thereof, and for example comprise crystalline $Cd_{1-(a+b)}Mn_aZn_bTe$ where a and/or b may be zero.

Combination of these and any other such materials may be considered which give spectroscopic detection rather than merely detecting amplitude of radiation after interaction with a sample.

An image generator may be provided to generate an image. In particular it may be adapted to receive from the data processor a plurality of spectroscopically resolved images from a plurality of "imaging" bands and display these images successively or simultaneously to aid in object differentiation as above described. For example spectroscopic differentiation in the collected data is represented in a single combined image as differentiated colour, shading or marking.

A collimator is preferably provided to produce an emitted beam of suitable geometry from the x-ray source. The geometry of the emitted beam will determine the most useful geometry of the detector system. At its simplest, particularly if the apparatus is being used purely to collect spectrally resolved transmission data for the purposes of deriving numerically an indication of mass attenuation coefficient, a simple, effectively one dimensional beam may be provided in conjunction with a simple single transmission detector.

However, in the preferred embodiment, the apparatus is further adapted for the generation of imaging information. It is intended in a possible mode of operation that the material identification provided in accordance with the numerical analysis method underlying the invention will serve in conjunction with imaging as an additional aid in the scanning of suspicious objects and in the identification of articles or materials therein, rather than being used in isolation. It is an advantage of the approach of the invention that useful compositional and imaging data can be obtained in principle for the same scan. More useful imaging data will generally be obtained by more complex beam and detector geometries.

For example, a beam may be collimated to have a spread in one or two dimensions, in particular to co-operate respectively with one or more linear detectors or with an area detector. Conveniently, linear and/or area detectors comprise linear and/or area arrays of a plurality of individual detector elements as above described.

The invention in particular relates to an apparatus and method operating on the line-scan principle, in which three dimensional objects are caused to move through a scanning zone and imaging information collected.

Imaging apparatus which employs the line-scan principle is well known. Typically, such apparatus will consist of an x-ray source, the beam of which may be collimated into a curtain, usually referred to as a "curtain beam", and is then detected by a linear detector for example comprising a linear photodiode array. Image information is obtained by having the object of interest move linearly for example at right angles with respect to the beam and storing successive scans of x-ray transmission information derived from the linear array from which a complete image frame can be compiled.

Accordingly, in this embodiment, the method comprises:
providing an x-ray source and an x-ray detector system spaced therefrom to define a scanning zone therebetween, the detector system comprising at least one and preferably a plurality of linear detectors capable of generating spectroscopically resolvable information about incident x-rays;
causing an object to move relative to and through the scanning zone;
resolving the resultant transmitted data in the manner above described.

Accordingly, in this embodiment, the apparatus comprises:
an x-ray source and an x-ray detector system spaced therefrom to define a scanning zone therebetween, the detector system comprising at least one and preferably a plurality of linear detectors capable of generating spectroscopically resolvable information about incident x-rays.

In accordance with this embodiment the radiation source is preferably collimated to produce a curtain beam and is thus a curtain beam x-ray source as will be familiar from conventional line scan apparatus.

Preferably the detector system comprises a plurality of linear detectors linearly or angularly spaced apart in generally parallel conformance in serial array. Each linear detector may comprise a linear array of detector elements.

The x-ray source may comprise a single primary source adapted to generate a beam such as a curtain beam aligned to be incident upon each linear detector in the spaced serial array at a suitable angular separation, from example by a suitable beam splitting apparatus. A single beam may be generated. Alternatively, multiple beams may be generated from a single source. Alternatively, multiple sources may be provided each generating a beam such as a curtain beam incident upon a linear detector in the serial array. The x-ray source may comprise a source combining any or all of the foregoing principles.

The provision of a plurality of linear detectors in accordance with this preferred embodiment of the invention offers an additional functionality. Data can be collected for an equivalent plurality of transmission paths as an object passes through a scanning zone. The provision of such a plurality of transmission paths between a source and differently positioned linear detectors or detector arrays gives the collected information the characteristics of the information collected by a conventional CT scanning apparatus, and allows the data to be processed additionally in a manner known from that technology.

For example, multiple transmission path data may be used to generate multiple images and thus improve the information content of the imaging aspect of operation in a familiar manner. Additionally or alternatively, multiple transmission paths through a given part of an object will lead to a varying of the effective through thickness, which can be employed to draw inferences about material content, again in a manner analogous to that known from CT scanning, and reinforce or further inform the inferences drawn by the derivation of data indicative of the mass attenuation coefficient in accordance with the basic principles of the invention.

With latter application in mind in particular, it will generally be preferable if a single source is provided and used for the multiple ray paths created by having a multiple array of linear detectors. This guarantees that the incident spectrum for each ray path is essentially the same, and eliminates one possible uncertainty. However, the same principles could be applied to systems using multiple sources of reasonable spectral reliability.

BRIEF DESCRIPTION OF THE DRAWINGS

The invention will now be described by way of example only with reference to the accompanying drawings in which.

DESCRIPTION OF THE PREFERRED EMBODIMENTS

Figure 1:
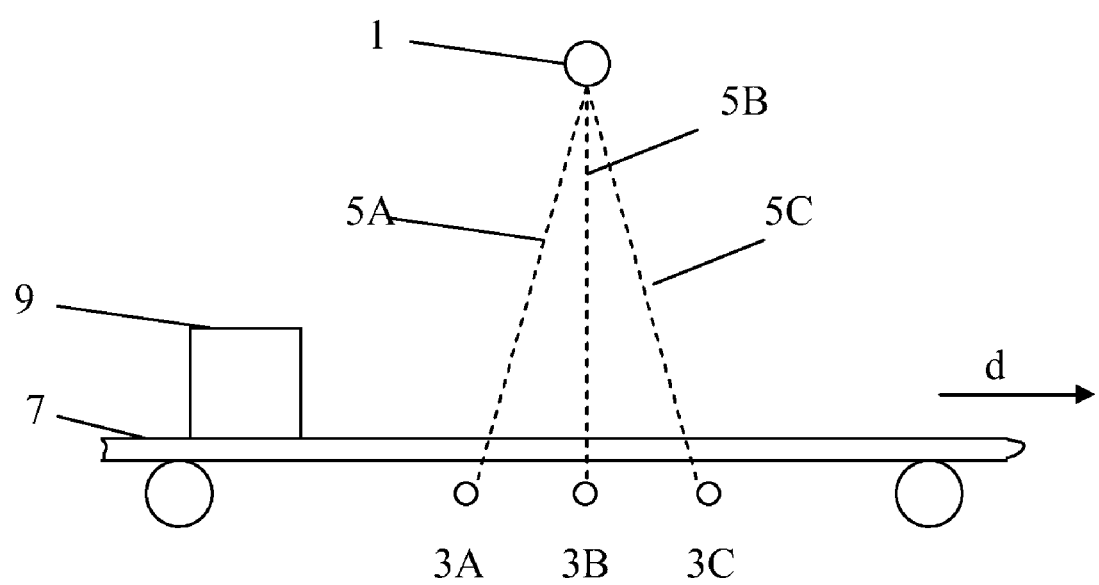
FIG. 1 is a side view of a representation of a scanning apparatus suitable for use in an embodiment of the invention with an optional imaging capability.

Referring to FIG. 1, a suitable x-ray source 1 is used to direct x-rays via a scanning zone in the direction of three linear detectors 3a to 3c.

As has previously been discussed, an envisaged apparatus in accordance with the invention may combine the materials identification capability of the energy-resolved data collection and manipulation aspect of the invention with the information provided by generating an image in order to reinforce the scanning of an unknown object, in particular where the unknown object is a container such as a baggage item including multiple articles, for example for security applications, and for example for the detection of explosives. With this application in mind the illustrated embodiment uses a single x-ray source collimated to produce a curtain beam incident upon the three linear detectors 3a to 3c (which in the embodiment each comprise a linear array of detector elements). Thus, a plurality of ray paths 5a to 5c are generated in the scanning zone by means of a plurality of curtain beams incident upon a linearly or angularly spaced array of such linear detectors. Incident ray paths 5a to 5c are shown through the scanning zone between the x-ray source 1 and, respectively, the detectors 3a to 3c.

In the embodiment, the linear array detectors 3a to 3c comprise material capable of spectroscopic resolution of incident x-rays, and in the specific example comprise cadmium telluride although the skilled person will appreciate that other material selections may be appropriate. To exploit this spectral resolution, the x-ray source emits x-rays across a broad energy spectrum. In the example a tungsten source is used, although the skilled person would appreciate that other materials might be appropriate.

An endless belt conveyor 7 causes an object to be scanned 9 to move in a direction d so as to intercept the ray paths 5a to 5c in the scanning zone. The envisaged application of this embodiment of the invention is as a security scanner, and object 9 can be considered typically to be a container that is expected to contain a variety of distinct objects which it would be useful and desirable to characterise compositionally and to view effectively in a third dimension (for example, an item of airline hold baggage). However, the skilled person would readily appreciate that the same principles can be applied for example to the scanning of objects for internal examination purposes, to medical scanning, and to similar applications.

Figure 3:
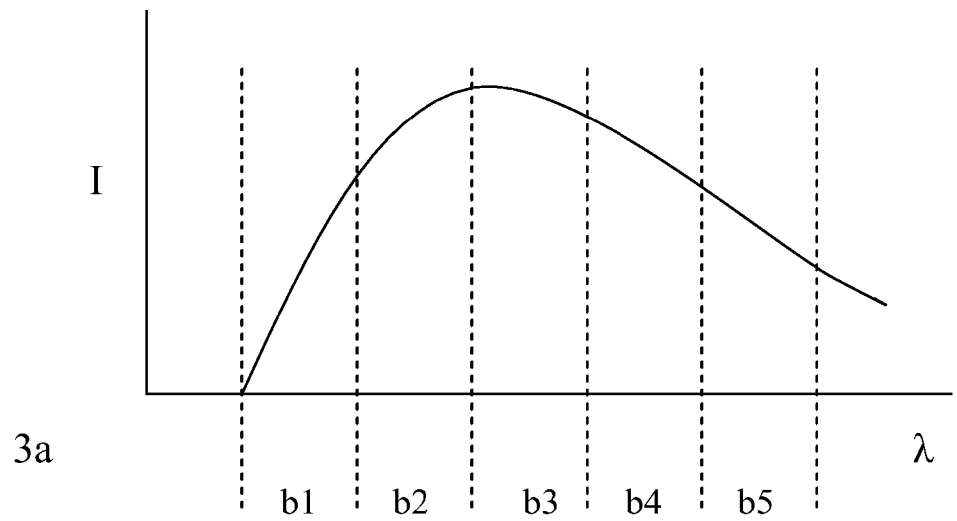
FIG. 3 illustrates a typical radiation source spectrum, and illustrates how it is partitioned to implement the invention in conjunction with an imaging operation.
Figure 3:
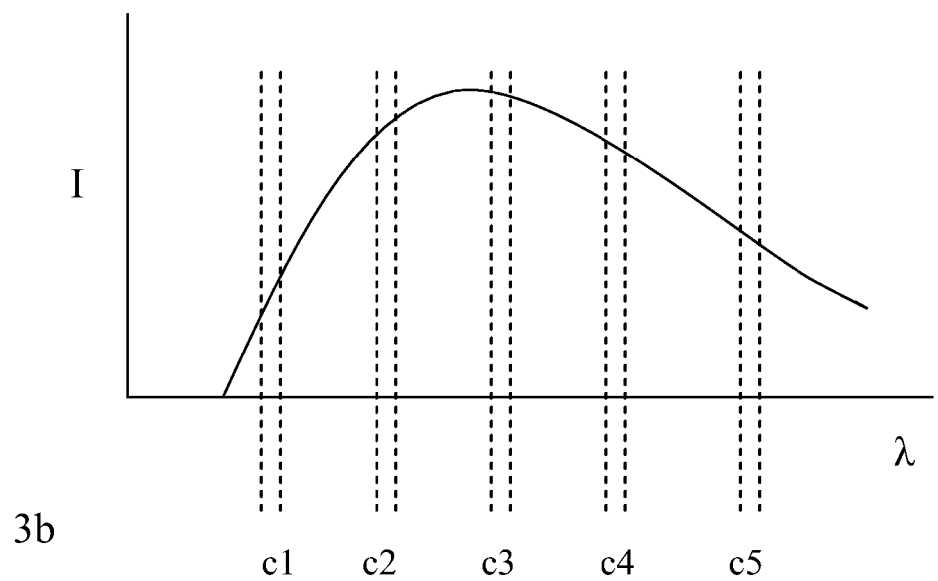
Figure 4:
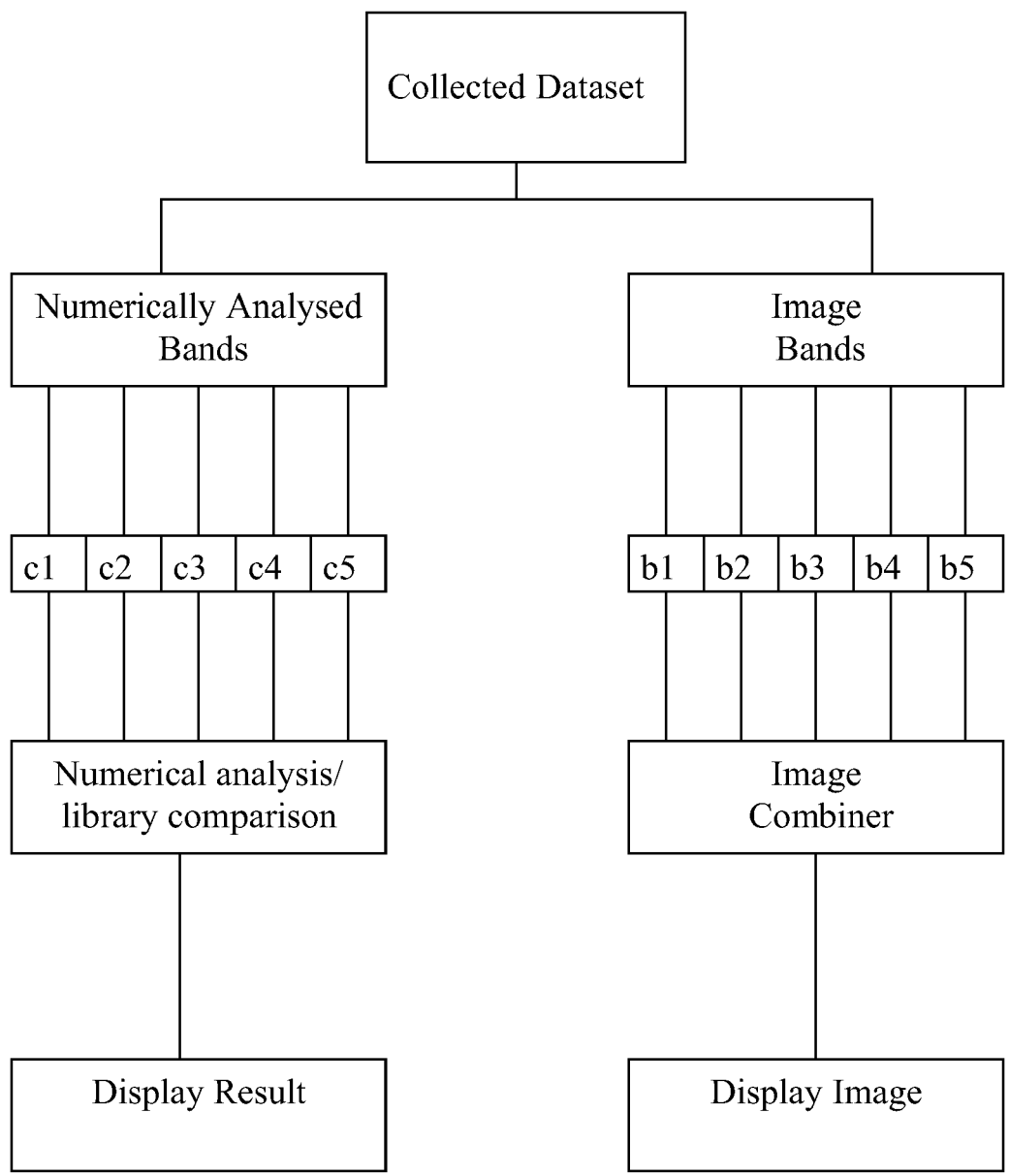
FIG. 4 is a schematic protocol for operation of the invention in conjunction with an imaging operation.

Datasets of transmitted intensity information are generated by building up transmitted information from each of the three detectors 3a to 3c. The processing of a dataset of information by resolving, at least to some extent, a relationship between incident energy/wavelength and transmitted intensity for both numerical analysis in accordance with the principles of the invention and spectroscopically resolved imaging purposes is illustrated in FIGS. 2 to 4.

Figure 2:
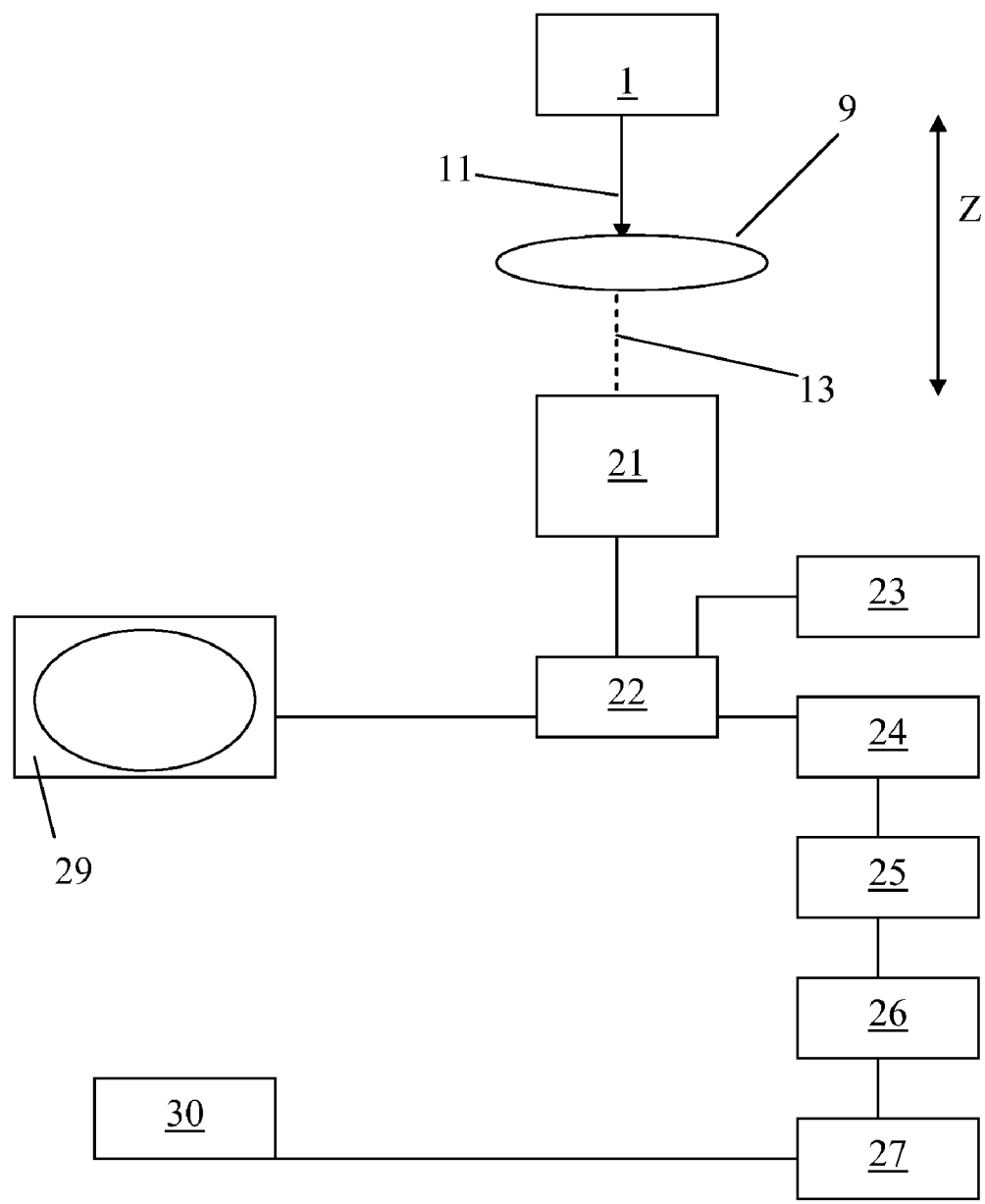
FIG. 2 is general schematic of a possible apparatus to implement the invention including a scanner of FIG. 1.

In the general schematic representation on FIG. 2, a single ray path only is shown for simplicity. An x-ray source 1 and laterally spaced detector apparatus assembly 21 together define a scanning zone Z between them. In use, an object to be scanned is brought into and through the scanning zone in the usual manner, for example on a suitable conveyor belt as above.

In the illustrated example, an object 9 sits in the scanning zone Z. An incident beam 11 from the x-ray source is illustrated. In this simple schematic, the incident beam is represented by the line 11. The transmitted beam 13 is incident upon a detector array 21.

The detector array 21 is in data communication with a processor 22. The detector array is used to generate a two dimensional "slice" in familiar manner. The inherent spectral resolution of the material in the array allows the processor 22 to resolve this image differentially across a plurality of pre-set frequency/energy bands in accordance with the principles of the invention by reference to energy band boundaries stored in the data register 23.

In the example embodiment a tungsten x-ray source, is used. A typical spectrum such as might be generated by tungsten of initial intensity against wavelength is illustrated in FIG. 3.

The main purpose of FIG. 3 is to illustrate two possible ways in which the spectrum may be resolved in accordance with the principles of the invention. In each case, the spectrum is resolved across five frequency bands. Although in mathematical principle some useful information can be derived from just three bands, it is suggested that five is a more practical minimum for complex heterogeneous objects if a reasonable inference about the functional variation of transmitted intensity with incident energy/frequency, and therefore about the mass attenuation coefficient, is to be derived.

The schematic illustrates two ways in which the spectrum may be resolved. In FIG. 3a, the bulk of the generated spectrum is divided between five relatively broad energy bands b1 to b5. In FIG. 3b, five relatively narrow bands, which may approximate even to individual energies, are defined c1 to c5. Neither alternative is in contradiction with the principles of the invention, and any combination may be used to generate useful results either for the numerical analysis of the invention or, in a preferred embodiment, for spectroscopically resolved imaging to give further information about an object under investigation.

In the preferred embodiment, the data is also used to generate an image, and most preferably a spectrally resolved image which is spectrally resolved itself across a plurality of frequency bands to give further information to the image. In such an embodiment, some of the resolved energy bands in FIG. 3, for example those illustrated in FIG. 3a, could be used to build up an energy-differentiated image for transmission to the display means 29. In this regard, the apparatus follows the same basic principles as conventional energy-differentiated imaging apparatus.

It differs in the functionality provided by the processor 22 which further acts in relation to a series of identified frequency bands, for example those in FIG. 3b, but in this function uses the data to generate a representative quantification of, and for example an average of, transmitted intensity in each band, which is then passed to the intensity data item register 24 for storage.

A calculation means 25 evaluates the ratio between successive intensity data items (for example, where data items are collected I1 to I5 relating to energy bands c1 to c5, the calculation means evaluates the quotient I1/I2, I2/I3, I3/I4, I4/I5). This calculation of such a quotient is capable in principle of removing from consideration variables, such as density and thickness, which do not vary with incident radiation energy, and therefore of providing a numerical indicator which is functionally related to energy, and consequently indicative of the primary energy-dependent variable, the mass attenuation coefficient.

A comparator 26 compares the data thereby produced with a library of data 27. The library of data may include pre-stored data of similar or at least numerically comparable nature which is related to or depends upon the mass attenuation constant for a range of materials, and in particular specified target materials. This may be a manually or automatically address library. Data may be preloaded or referenced, or may be generated or added to over time by operation of the apparatus with known materials.

By virtue of this comparison, inferences may be drawn about the likely material content in the transmission path. This may be displayed on the display means 30, for example in association with the image display 29. In addition to its value in isolation, this may be used in conjunction with the image displayed on the display means 29 the better to characterise the contents or composition of an object under investigation.

The data collection and manipulation process is illustrated by the flow chart of FIG. 4, again for a preferred embodiment in which spectral resolution of transmitted intensity is used both for the numerical identification process of the invention and for an additional imaging purpose. Reading from top to bottom, the collected dataset is resolved both into the series of image bands and into the series of bands for numerical analysis in the manner illustrated in FIG. 3.

Resolution of a transmitted intensity dataset into image bands produces a series of images b1, b2, b3, b4 and b5 which together represent intensities of transmitted x-rays across relatively broad band widths but differentiated by energy across the spectrum. In this way a degree of differentiation between objects of different composition is possible. Objects of different composition, and in particular a different atomic number, will tend to exhibit varying responses. If the different images b1 to b5 are for example successively displayed, or, more preferably, given distinctive colourations and displayed simultaneously in a single composite image, additional resolution of objects from the scan can be provided. This process is reasonably conventional.

Where the invention notably differs is in the additional resolution of the transmitted intensity dataset into bands c1 to c5. In the embodiment these bands are relatively narrow, but this is illustrative only. There is no reason in principle why the same bands could not be used for both purposes. The resolved transmission data for these bands in the register 25 are processed as above to generate intensity ratios and thus a numerical representation of the variation of intensity with energy and then a comparator references equivalent stored data to allow inferences to be drawn about material content. This may be displayed for example in combination with the complex image generated from the imaging band resolution or as an additional information display in association with the image or on a bespoke display.

In an example security or like use the apparatus is employed for the detection of contraband materials, for example explosives or other dangerous or prohibited materials. Data suitable to alert for the presence of these materials may be stored in the library. The apparatus may include visible and/or audio alarm means, eg as part of the display 30, actuated when the comparator produces an indication that a target contraband material is likely to be present.

Figure 5A:
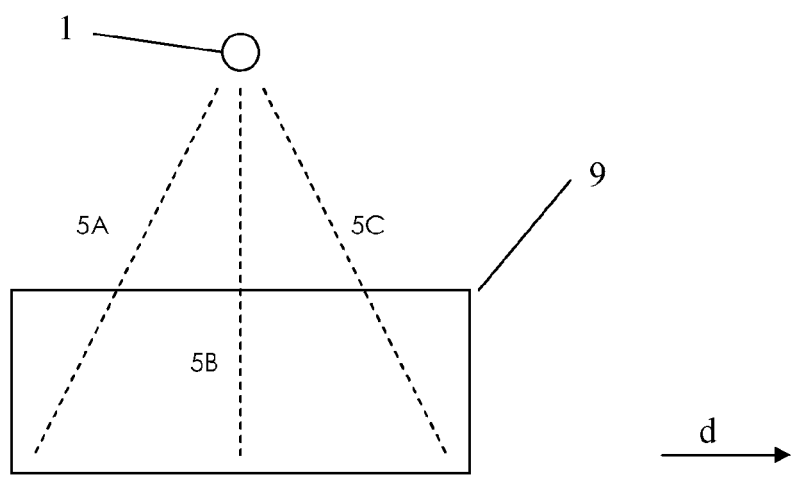
FIG. 5 illustrates the effect that can be created by images generated by means of the multiple ray paths provided by the embodiment of FIG. 1.

Although the invention, especially in non-imaging mode of operation, requires only a single ray path, the embodiment of FIG. 1 presented plural ray paths through an object. FIG. 5 illustrates an additional effect that can be created by images generated by means of the multiple ray paths provided by the embodiment of FIG. 1 which can further enhance the information provided.

Figure 5B:
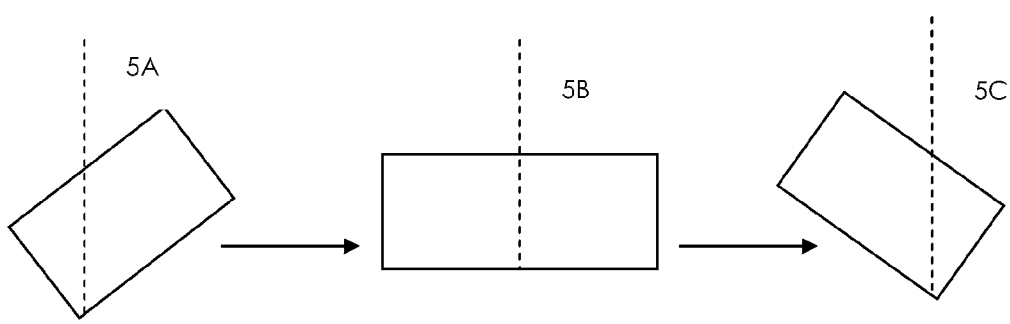

As an object 9 passes through incident ray paths 5a to 5c (see FIG. 5a) three images are generated in which the object is oriented differently relative to the x-ray source 1. Successive display of these images will cause the object to appear to rotate as is illustrated in FIG. 5b.

This ability in effect to get a view of the object which is in effect rotatable in a third dimension can be seen in some respects as analogous to CT scanning. In a conventional CT scanner, relative rotational movement between scanner and scanned object (usually, by orbital movement of the scanner) allows a rotatable image to be collected. The multiple image generated in this example offers some of these features as a result of the multiple ray paths provided by the apparatus, but with a less complex geometry, and for example on a simple linear conveyor such as is typically used in security scanning systems.

This not only offers an additional image functionality. It also offers an additional material identification functionality. Multiple transmission paths through a given part of an object will lead to a varying of the effective through thickness. Again, this mimics the effect produced by a CT scan, and analogous processing of such data can be used to reinforce or further inform the inferences drawn by the derivation of data indicative of the mass attenuation coefficient in accordance with the basic principles of the invention.

In this way, in accordance with the invention, an apparatus and method is described which can offer specific material characterisation based on resolved energy detection and data processing and also offer the option of generating an image and in particular an image which has some general energy differentiation to facilitate in distinguishing between different objects of different composition. In this combined mode the invention offers in a single apparatus a materials (eg explosive) detection capability analogous to that of prior art CT scanners commonly used for hold baggage scanning (and which typically have limited or no imaging application) in combination with an imaging capability with the advantages of a line scan such as is commonly used for hand baggage scanning. All this information is obtained from the primary transmitted beam by the provision of specific detectors having a functionality to effect spectroscopic resolution of transmitted intensity across at least three distinct energy bands.

The invention claimed is:

1. A method of obtaining radiation transmission data from an object comprising the steps of:

providing a radiation source and a radiation detector system spaced therefrom to define a scanning zone therebetween, the detector system being capable of detecting and collecting spectroscopically resolvable information about incident radiation;

collecting one or more datasets of transmitted intensity information about radiation incident at the detector system and hence interaction of an object in the scanning zone with incident radiation at at least one scanning position from radiation received at the detector system after transmission through the object;

resolving each said intensity dataset across at least three frequency bands within the spectrum of the source to produce an intensity data item for each band;

evaluating a numerical relationship between the intensity data items for at least two pairs of such frequency bands in a given intensity dataset to obtain a numerical indicator in functional relationship with a characteristic physical material property associated with the transmission of a source radiation that varies functionally with the radiation energy;

comparing the numerical indicator with a library of data indicative of such characteristic physical material property for a range of potential component materials, in order to obtain an indication of the likely composition of any object producing such intensity dataset.

2. A method in accordance with claim 1 wherein the step of determining a numerical relationship comprises the step of determining a ratio between the intensity data items for at least two pairs of such frequency bands in a given intensity dataset.

3. A method in accordance with claim 1 wherein the characteristic material property is the mass attenuation coefficient.

4. A method in accordance with claim 1 wherein the numerical indicator in functional relationship with a characteristic physical material property is obtained by fitting the intensity data items to an intensity relationship in accordance with which the material property/coefficient determines intensity of the collected radiation in functional manner that vanes with radiation energy.

5. A method in accordance with claim 4 wherein the intensity relationship is the equation:

$$I/Io = \exp[-(\mu/\rho)\rho t]$$

and the numerical indicator of a characteristic material property derived therefrom is the mass attenuation coefficient.

6. A method in accordance with claim 1 wherein the dataset of information about radiation incidence collected at the detector is used to generate an image of an object in the scanning zone.

7. A method in accordance with claim 1 comprising the additional step of causing an object to move relative to and through the scanning zone and thereby collecting a plurality of successive datasets.

8. A method in accordance with claim 7 wherein the plurality of successive datasets are used to generate a corresponding plurality of successive images as an object moves relative to and through the scanning zone.

9. A method in accordance with claim 6 comprising the additional step of displaying a generated image or images.

10. A method in accordance with claim 9 wherein a succession of images is generated, and each such image is resolved spectroscopically across a plurality of frequency bands within the spectrum of the source which are allocated to generate a series of energy-differentiated images.

11. A method in accordance with claim 1 operating on the line-scan principle, comprising:

providing an x-ray source and an x-ray detector system spaced therefrom to define a scanning zone therebetween, the detector system comprising at least one linear detector capable of generating spectroscopically resolvable information about incident x-rays;

causing an object to move relative to and through the scanning zone; resolving the resultant transmitted data in accordance with any preceding claim.

12. A method in accordance with claim 11 wherein the radiation source is used to generate a curtain beam.

13. A method in accordance with claim 11 wherein the detector system comprises a plurality of linear detectors in a laterally spaced serial array at a suitable angular separation, and where data is collected from the resultant multiple ray paths between source and array of linear detectors.

14. A method in accordance with claim 13 wherein data from the said multiple ray paths are used to generate additional imaging and/or material compositional information.

15. An apparatus for scanning of and obtaining radiation transmission data from an object comprising:

a radiation source and a radiation detector system spaced therefrom to define a scanning zone therebetween and to collect in use a dataset of information about radiation incident at the detector system after transmission through an object in the scanning zone at at least one scanning position the detection system being capable of detecting and collecting spectroscopically resolvable information about incident radiation;

a data processing apparatus to process and resolve each such dataset or image spectroscopically across at least three frequency bands within the spectrum of the source to produce intensity data item for each band;

an intensity data item register to store such resolved data items for each dataset;

calculation means to evaluate a numerical relationship between intensity data items for at least two pairs of such frequency bands in a given intensity dataset and for each successive such frequency band to obtain a numerical indicator in functional relationship with a physical material property associated with transmission of the source radiation that varies functionally with radiation energy;

a further data register to store such numerical indicator;

a data library of data indicative of such characteristic physical material property for a range of potential component materials;

a comparator to compare the numerical indicator with data in the library and derive therefrom an indication of the likely material content of an object in the scanning zone producing the said intensity dataset.

16. An apparatus in accordance with claim 15 comprising sample retention means to support a liquid sample in the scanning zone on whilst collecting intensity information about radiation incident at the detector system after interaction with the liquid sample.

17. An apparatus in accordance with claim 15 further comprising an object handler to cause an object to move relative to and through the scanning zone in use.

18. An apparatus in accordance with claim 15 further including an image generation apparatus adapted co-operably with the detector to collect in use data for at least one image of an object in the scanning zone and to generate at least one image from the output of the detector system.

19. An apparatus in accordance with claim 15 further including an image display means adapted to display at least one image.

20. An apparatus in accordance with claim 15 wherein a detector is adapted to produce spectroscopic resolution in that it is fabricated from a material selected to exhibit inherently as a direct material property a direct variable electrical response to different parts of the x-ray spectrum.

21. An apparatus in accordance with claim 20 wherein the detector comprises a semiconductor material selected from cadmium telluride, cadmium zinc telluride (CZT), cadmium manganese telluride (CMT), germanium, lanthanum bromide, thorium bromide.

22. An apparatus in accordance with claim 20 wherein the detector comprises a semiconductor material or materials formed as bulk crystal including a Group II-VI semiconductor material.

23. An apparatus in accordance with claim 20 wherein the detector comprises a semiconductor material selected from cadmium telluride, cadmium zinc telluride (CZT), cadmium manganese telluride (CMT).

24. An apparatus in accordance with claim 15 operating on the line-scan principle, comprising:
an x-ray source and an x-ray detector system spaced therefrom to define a scanning zone therebetween, the detector system comprising at least one linear detector capable of generating spectroscopically resolvable information about incident x-rays.

25. An apparatus in accordance with claim 24 wherein the radiation source is a collimated to produce a curtain beam.

26. An apparatus in accordance with claim 24 wherein the detector system comprises a plurality of linear detectors in a laterally spaced serial array at a suitable angular separation such that intensity data may be collected in use from the resultant multiple ray paths between source and array of linear detectors.

* * * * *